(12) United States Patent
Ookawa

(10) Patent No.: US 7,041,190 B2
(45) Date of Patent: May 9, 2006

(54) ADHESIVE SHEET FOR DICING GLASS SUBSTRATE AND METHOD OF DICING GLASS SUBSTRATE

(75) Inventor: Yuuji Ookawa, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 26 days.

(21) Appl. No.: 10/452,893

(22) Filed: Jun. 2, 2003

(65) Prior Publication Data

US 2004/0020338 A1 Feb. 5, 2004

(30) Foreign Application Priority Data

Jun. 10, 2002 (JP) .............................. 2002-168820

(51) Int. Cl.
*B32B 31/00* (2006.01)

(52) U.S. Cl. ....................... 156/268; 156/344; 438/464

(58) Field of Classification Search ................ 156/344, 156/268; 438/464
See application file for complete search history.

(56) References Cited

U.S. PATENT DOCUMENTS

| | | | | |
|---|---|---|---|---|
| 4,287,255 A | * | 9/1981 | Wong et al. | ................. 428/343 |
| 4,606,962 A | * | 8/1986 | Reylek et al. | ................. 428/148 |
| 4,710,190 A | * | 12/1987 | Wood et al. | ................. 604/389 |
| 4,837,070 A | * | 6/1989 | Weber et al. | ................. 428/172 |
| 5,501,897 A | * | 3/1996 | Ichikawa et al. | ............ 442/146 |
| 5,671,511 A | * | 9/1997 | Hattori et al. | ................. 24/444 |
| 5,793,108 A | * | 8/1998 | Nakanishi et al. | ........... 257/723 |
| 6,042,922 A | * | 3/2000 | Senoo et al. | ................. 428/66.6 |
| 6,342,434 B1 | * | 1/2002 | Miyamoto et al. | ........... 438/464 |
| 6,444,310 B1 | * | 9/2002 | Senoo et al. | ................. 428/354 |
| 6,700,631 B1 | * | 3/2004 | Inoue et al. | ................... 349/45 |
| 2004/0023043 A1 | * | 2/2004 | Ishikawa et al. | ............ 428/447 |

FOREIGN PATENT DOCUMENTS

| | | |
|---|---|---|
| EP | 1 270 696 A2 | 1/1993 |
| JP | 60-196956 | 10/1985 |
| JP | 60-223139 | 11/1985 |
| JP | 01290237 | 11/1989 |
| JP | 6-220412 | * 8/1994 |
| JP | 2000-208563 | * 7/2000 |
| JP | 2000-281990 | 10/2000 |
| JP | 2001-274117 | 10/2001 |

* cited by examiner

*Primary Examiner*—Mark A. Osele
(74) *Attorney, Agent, or Firm*—Knobbe Martens Olson & Bear, LLP

(57) ABSTRACT

An adhesive sheet for dicing glass substrate comprising a base film and an adhesive layer arranged on the base film, wherein the base film has a thickness of 130 μm or more and a tensile modulus of 1 GPa or more, and the adhesive layer has a thickness of 9 μm or less. The adhesive sheet can give cut pieces excellent in shape and hardly causes cut pieces to be chipped or to scatter chips.

6 Claims, 1 Drawing Sheet

[FIG. 1]
[FIG. 2]
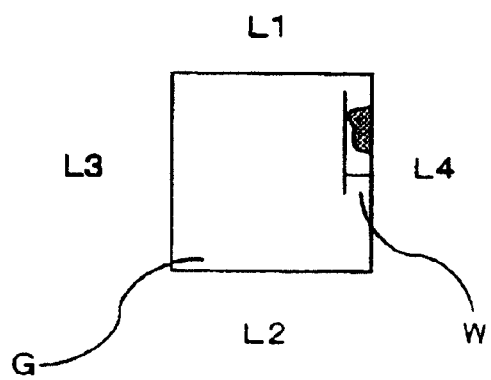
[FIG. 3]
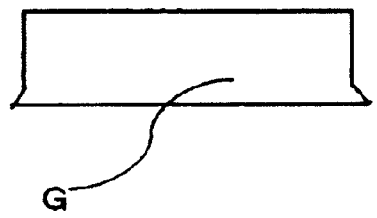

ADHESIVE SHEET FOR DICING GLASS SUBSTRATE AND METHOD OF DICING GLASS SUBSTRATE

BACKGROUND OF THE INVENTION

1. Field of the Invention

The present invention relates to an adhesive sheet for dicing glass substrate and a method of dicing glass substrate. This invention also relates to a cut piece of glass substrate, which is obtained by this method. The adhesive sheet for dicing glass substrate can be utilized in various industrial fields and is particularly useful as e.g. a glass substrate-fixing sheet used for sticking and fixing a glass substrate provided with semiconductor circuits or a glass substrate used in optical communication etc. in order to cut the glass substrate into small pieces.

2. Description of the Related Art

Semiconductor products or optical articles made of glass, quartz, rock crystal, sapphire or lens are produced by cutting and separating (dicing) a glass substrate having formed various circuits or subjected to surface treatment etc., to form small pieces serving as individual elements or parts. In this production process, the glass substrate having an adhesive sheet stuck thereon is subjected to a dicing step, a washing step, a drying step and a pick-up step respectively and then to a subsequent step. The adhesive sheet used in the dicing to pick-up steps of the glass substrate is desired to exhibit sufficient adhesion to cut pieces in the dicing to drying steps and to exhibit adhesion in the pick-up step to such an extent that its adhesive does not adhere to the cut pieces.

As the adhesive sheet for dicing glass substrate, a dicing adhesive sheet applied to semiconductor wafers has been used. The thickness of such a dicing adhesive sheet is usually about 70 to 120 µm.

The glass substrate is thicker than a semiconductor wafer and is thus diced by using a blade having a thickness of about 150 to 300 µm in order to conduct stable dicing. Due to a round top of the dicing blade, however, a cut piece from a conventional dicing adhesive sheet has a broader width in a lower section, to have an irregular shape like skirt.

Further, the glass substrate is very brittle and easily broken. Accordingly, when the adhesive sheet for fixing the glass substrate is significantly deformed by pressure from the dicing blade, the glass substrate cannot endure the deformation and is thus broken to cause chipping or to scatter chips, causing a problem in qualities of cut pieces.

An object of the present invention is to provide an adhesive sheet for dicing glass substrate, which can give cut pieces excellent in shape and hardly causes cut pieces to be chipped or to scatter chips. Another object of this invention is to provide a method of dicing glass substrate by using this adhesive sheet. A still other object of this invention is to provide a cut piece of glass substrate, which is obtained by this method.

SUMMARY OF THE INVENTION

As a result of extensive study to solve the problem described above, the present inventors found that these objects can be achieved by using the following adhesive sheet for dicing glass substrate.

That is, this invention relates to an adhesive sheet for dicing glass substrate comprising a base film and an adhesive layer arranged on the base film, wherein the base film has a thickness of 130 µm or more and a tensile modulus of 1 GPa or more, and the adhesive layer has a thickness of 9 µm or less.

In the adhesive sheet described above, the thickness of the base film is 130 µm or more, thus preventing an irregular shape of cut pieces obtained by dicing of glass substrate, to give cut pieces excellent in shape. The thickness of the base film is usually from 130 µm to 300 µm. The thickness of the base film is preferably 150 to 300 µm, more preferably 150 to 250 µm, still more preferably 150 to 225 µm.

The base film makes use of a rigid material having a tensile modulus of 1 GPa or more. The tensile modulus of the base film is preferably 1 to 4 GPa, more preferably 1.5 to 4 GPa. As the base film having such tensile modulus, a polyester film is preferably used. A base film made of a soft material such as polyethylene or polyvinyl chloride permits significant deformation of the adhesive sheet, while a base film of a relatively rigid material having a thickness of 130 µm or more and a tensile modulus of 1 GPa or more can prevent deformation of the adhesive sheet. In addition, the thickness of the adhesive layer is 9 µm or less, thus reducing the deformation of the adhesive sheet by pressure from a dicing blade and hardly causing cut pieces to be chipped or to scatter chips. The thickness of the adhesive layer is preferably 4 to 9 µm, more preferably 4 to 7 µm.

JP-A 2000-281990 discloses an adhesive sheet for dicing containing a substrate having a thickness of 70 to 300 µm. However, the adhesive sheet is used as an adhesive sheet for package substrate having a significantly uneven surface, thus requiring an adhesive layer of 10 to 50 µm in thickness. The adhesive sheet having such thick adhesive layer cannot prevent cut pieces from being chipped or scattering chips.

In the adhesive sheet for dicing glass substrate, its adhesive layer is preferably a radiation-curing adhesive layer. The radiation-curing adhesive layer exhibits sufficient initial adhesion to a glass substrate to fix the substrate to the adhesive sheet in the dicing step. In the pick-up step, the radiation-curing adhesive layer can reduce the adhesion irradiated with UV rays, to make it easy to pick cut pieces up from the adhesive sheet. The UV-curing adhesive layer is particularly preferably used for a brittle and easily broken glass substrate.

As the UV-curing adhesive sheet, for example a UV-curing adhesive sheet coated with an adhesive comprising a low-molecular compound having at least 2 photo-polymerizable carbon-carbon double bonds in its molecule capable of forming a three-dimensional network upon irradiation of the surface of a base substrate with UV rays has been proposed in JP-A 60-196956 and JP-A 60-223139.

This invention also relates to a method of dicing glass substrate comprising steps of: sticking the above adhesive sheet on a glass substrate, and dicing the glass substrate. The resulting cut pieces (elements etc.) of the glass substrate are excellent in shape and are prevented from being chipped and scattering chips. Accordingly, the present method can contribute significantly to improving the production yield of elements in a user line.

The method of dicing glass substrate can also be applied preferably to cutting of a glass substrate by dicing into pieces of 3 mm×3 mm or less in size. Generally, when the size of cut pieces is 3 mm×3 mm or less, the cut pieces have an irregular shape or easily undergo chipping or scatter chips, but the adhesive sheet of this invention can provide cut pieces without such problems. Depending on use, the size of the cut pieces can be suitably determined without particular limitation. Because the cut pieces are usually square, their size is expressed as described above, but the shape of the cut pieces can also be suitably determined depending on use, without particular limitation.

In the method of dicing glass substrate, the glass substrate is diced preferably after being left for at least 24 hours after sticking the adhesive sheet thereon. When the size of cut pieces is small, the dicing of the glass substrate immediately after sticking the adhesive sheet thereon tends to cause scattering of chips in a large amount, but when the glass substrate is diced after being left for at least 24 hours after sticking the adhesive sheet thereon until the adhesive comes to have sufficient adhesion, scattering of chips can be prevented even if the glass substrate is cut into pieces of 1 mm×1 mm or less in size. Depending on the size of cut pieces, the time for which the glass substrate is left can be suitably determined without particular limitation. For example, when the size of the cut pieces is 3 mm×3 mm, the glass substrate is left for 12 hours or more, and when the size of the cut pieces is 5 mm×5 mm, the glass substrate is left for 0.5 hour or more, whereby chip scattering can be prevented.

In the method of dicing glass substrate, the adhesive sheet is stuck on the glass substrate preferably under heating at a temperature of 40° C. or more. When the size of cut pieces is small, chip scattering tends to occur significantly, but when the glass substrate during sticking the adhesive sheet thereon is at 40° C. or more, adhesion is rapidly exhibited to prevent chip scattering in the subsequent chipping step even if the glass substrate are cut into small pieces of 1 mm×1 mm in size. The temperature of the glass substrate during sticking the adhesive sheet is preferably in the range of 40 to 80° C., more preferably 40 to 60° C. When the adhesive sheet stuck at the above temperature on the glass substrate is left, the adhesive sheet is left usually at ordinary temperatures.

Further, this invention relates to a cut piece of glass substrate, which is obtained by the method of dicing glass substrate.

BRIEF DESCRIPTION OF THE DRAWINGS

FIG. 1 is an example drawing showing sectional view of the adhesive sheet for dicing glass substrate.

FIG. 2 is an example drawing showing backside chipping.

FIG. 3 is an example drawing showing irregular shape of section of cut piece.

DETAILED DESCRIPTION OF THE INVENTION

Hereinafter, the adhesive sheet for dicing glass substrate according to the present invention is described in more detail by reference to the drawings. FIG. 1 shows a section of the adhesive sheet for dicing glass substrate, comprising an adhesive layer 2 arranged on a base film 1. The adhesive layer 2 can be provided with a separator 3.

The base film makes use of a material having a tensile modulus of 1 GPa or more. The base film made of such a material includes, for example, polyester film, polyphenylene sulfide film etc. The polyester includes polyethylene terephthalate, polybutylene terephthalate, polyethylene naphthalate etc. Among these polyesters, polyethylene terephthalate is preferable. These base films may be non-stretched or may be subjected if necessary to uniaxial or biaxial stretching. The surface of the base film can be subjected if necessary to ordinary physical or chemical treatment such as treatment with a releasing agent, matt treatment, corona discharge treatment, primer treatment, and crosslinking treatment. The thickness of the base film is 130 μm or more as described above.

The adhesive that can be used in formation of the adhesive layer may be for example a generally used pressure-sensitive adhesive, and suitable adhesives such as acrylic adhesive, saturated polyester-based adhesive and rubber-based adhesive can be used. In particular, the acrylic adhesive based on an acrylic polymer is used preferably because of its adhesion to the base film and its easy molecular design.

The acrylic polymer include acrylic polymers made from one or more alkyl (meth) acrylates (for example, $C_{1-30}$ alkyl, particularly $C_{4-18}$ linear or branched alkyl esters such as methyl ester, ethyl ester, propyl ester, isopropyl ester, butyl ester, isobutyl ester, s-butyl ester, t-butyl ester, pentyl ester, isopentyl ester, hexyl ester, heptyl ester, octyl ester, 2-ethylhexyl ester, isooctyl ester, nonyl ester, decyl ester, isodecyl ester, undecyl ester, dodecyl ester, tridecyl ester, tetradecyl ester, hexadecyl ester, octadecyl ester and eicosyl ester) and cycloalkyl (meth) acrylates (for example, cyclopentyl ester, cyclohexyl ester etc.) as monomer components. As main monomers, alkyl acrylates giving homopolymers having a glass transition point of −50° C. or less are usually used. The (meth) acrylates refer to acrylates and/or methacrylates, and the term "(meth)" in this invention is used in this meaning.

For the purpose of improving cohesive force, heat resistance etc., the acrylic polymer may, if necessary, contain monomers corresponding to other monomer components copolymerizable with the alkyl (meth) acrylates or cycloalkyl esters. Such monomer components include, for example, carboxyl group-containing monomers such as acrylic acid, methacrylic acid, carboxyethyl (meth) acrylate, carboxypentyl (meth) acrylate, itaconic acid, maleic acid, fumaric acid and crotonic acid; acid anhydride monomers such as maleic anhydride and itaconic anhydride; hydroxyl group-containing monomers such as 2-hydroxyethyl (meth) acrylate, 2-hydroxypropyl (meth) acrylate, 4-hydroxybutyl (meth) acrylate, 6-hydroxyhexyl (meth) acrylate, 8-hydroxyoctyl (meth) acrylate, 10-hydroxydecyl (meth) acrylate, 12-hydroxylauryl (meth) acrylate and (4-hydroxymethylcyclohexyl) methyl (meth) acrylate; sulfonate group-containing monomers such as styrenesulfonic acid, allylsulfonic acid, 2-(meth) acrylamide-2-methylpropanesulfonic acid, (meth) acrylamide propanesulfonic acid, sulfopropyl (meth) acrylate and (meth) acryloyloxy naphthalenesulfonic acid; phosphate group-containing monomers such as 2-hydroxyethylacryloyl phosphate; and glycidyl (meth) acrylate, (meth) acrylamide, N-hydroxymethylamide (meth) acrylate, alkylamioalkyl (meth) acrylates such as dimethylaminoethyl methacrylate and t-butylaminoethyl methacrylate, vinyl acetate, styrene and acrylonitrile. These copolymerizable monomer components can be used alone or in combination thereof. The amount of these copolymerizable monomers used is preferably 40% by weight or less based on the whole monomer components.

For crosslinking, the acrylic polymer can contain copolymerizable monomer components such as multifunctional monomers are necessary. The multifunctional monomers include, for example, hexanediol di(meth)acrylate, (poly) ethylene glycol di(meth)acrylate, (poly)propylene glycol di(meth)acrylate, neopentyl glycol di(meth)acrylate, pentaerythritol di(meth)acrylate, trimethylol propane tri(meth) acrylate, pentaerythritol tri(meth)acrylate, dipentaerythritol hexa(meth)acrylate, epoxy(meth)acrylate, polyester (meth) acrylate, urethane (meth)acrylate etc. These multifunctional monomers can also be used alone or in combination thereof. From the viewpoint of adhesion characteristics etc., the amount of the multifunctional monomers used is preferably 30% by weight or less based on the whole monomer components.

The acrylic polymer is obtained by polymerizing a single monomer or a mixture of two or more monomers. Polymerization can be carried out in any systems such as solution polymerization, emulsion polymerization, bulk polymerization and suspension polymerization. From the viewpoint of preventing pollution of semiconductor wafers etc., the content of low-molecular components in the adhesive layer is preferably lower as described above. From this viewpoint, the number-average molecular weight of the acrylic polymer is preferably 300,000 or more, more preferably 400,000 to 3,000,000.

The saturated polyester includes, for example, saturated polyesters, a condensation product of polyvalent alcohols with polyvalent carboxylic acids. The polyvalent alcohols include glycols such as ethylene glycol, propylene glycol and 1,4-butanediol. The polyvalent carboxylic acids include aromatic dicarboxylic acids such as terephthalic acid and isophthalic acid, and fatty dicarboxylic acids such as adipic acid and sebacic acid. The saturated polyester is preferably a saturated copolyester using two or more polyvalent carboxylic acids, for example an aromatic dicarboxylic acid and a fatty dicarboxylic acid.

An external crosslinking agent can also be added to the adhesive. The method of crosslinking is exemplarily a method of adding a polyisocyanate compound, an epoxy compound, an aziridine compound, a melamine-based crosslinking agent, urea resin, an acid anhydride, polyamine, a carboxyl group-containing polymer or the like thereto and reacting the mixture. When the external crosslinking agent is used, its amount is determined suitably depending on balance with the base polymer to be crosslinked or on the intended use of the adhesive. Generally, the crosslinking agent is compounded in an amount of 5 parts by weight or less based on 100 parts by weight of the base polymer.

The adhesive may make use of a wide variety of conventionally known additives such as a tackifier, a plasticizer, a filler, an aging inhibitor and a coloring agent if necessary in addition to the components described above.

The adhesive layer can be prepared so as to be releasable by forming this layer from a radiation-curing adhesive or a thermally foaming adhesive. When the thermally foaming adhesive is used, two or more adhesive layers are formed, and the adhesive layer at the side of the base film is preferably produced from the thermally foaming adhesive. In this case, the adhesive layer as the surface layer can be produced from a radiation-curing adhesive.

The radiation-curing adhesive is not limited insofar as it has radiation-curing functional groups such as carbon-carbon double bonds and exhibits adhesion. The radiation-curing adhesive is desirably the one lowering adhesion upon irradiation with radiations, particularly UV rays.

The radiation-curing adhesive includes, for example radiation-curing adhesives of addition type comprising radiation-curing components incorporated into general pressure-sensitive adhesives such as the acrylic adhesive, saturated polyester-based adhesive and rubber-based adhesive described above. The radiation-curing components include monomers, oligomers and polymers having carbon-carbon double bonds in the molecule and curable by radiation polymerization.

The radiation-curing monomer components incorporated include, for example, urethane (meth)acrylate; esters of (meth)acrylic acid with polyvalent alcohol, for example trimethylol propane tri(meth)acrylate, tetramethylol methane tetra(meth)acrylate, pentaerythritol tri(meth)acrylate, pentaerythritol tetra(meth)acrylate, dipentaerythritol monohydroxypenta(meth)acrylate, dipentaerythritol hexa(meth) acrylate, 1,4-butanediol di(meth)acrylate, tetraethylene glycol di(meth)acrylate, 1,6-hexanediol di(meth)acrylate and neopentyl glycol di(meth)acrylate; and cyanurate compounds or isocyanurate compounds such as 2-propenyl di-3-butenyl cyanurate, 2-hydroxyethyl bis(2-acryloxyethyl) isocyanurate, tris(2-acryloxyethyl) isocyanurate and tris(2-methacryloxyethyl) isocyanurate. The radiation-curing oligomer components include various oligomers based on urethane, polyether, polyester, polycarbonate or polybutadiene, and the molecular weight thereof is preferably in the range of 100 to 30,000. Depending on the type of the adhesive layer, the amount of the radiation-curing monomer components and oligomer components blended can be suitably determined such that the adhesion of the adhesive layer can be reduced. Generally, their amount is for example not higher than 500 parts by weight, preferably not higher than 150 parts by weight, based on 100 parts by weight of the base polymer such as the acrylic polymer constituting the adhesive.

The radiation-curing adhesive includes not only the radiation-curing adhesives of addition type described above, but also inherent radiation-curing adhesives using a base polymer having carbon-carbon double bonds in side or main chains or terminals of main chains of the polymer. The inherent radiation-curing adhesive is preferably used because it does not require low-molecular oligomer components etc. or does not contain a large amount of such components, and thus an adhesive layer of stabilized layer structure can be formed without migration with time of oligomer components etc. in the adhesive.

The base polymer having carbon-carbon double bonds is not particularly limited insofar as it has carbon-carbon double bonds and exhibits adhesion. The base polymer is preferably the one having an acrylic polymer as the fundamental skeleton. The fundamental skeleton of the acrylic polymer includes the acrylic polymer exemplified above.

The method of introducing carbon-carbon double bonds into the acrylic polymer is not particularly limited, and various methods can be used, but introduction of carbon-carbon double bonds into side chains of the polymer makes molecular design easy. For example, a monomer having a functional group is copolymerized as a component of the acrylic polymer, followed by subjecting the resulting copolymer to condensation or addition reaction with a compound having a carbon-carbon double bond and a functional group capable of reacting with the above functional group while maintaining the radiation-curing properties of the carbon-carbon double bond during the reaction.

The combination of such functional groups includes, for example, combinations of carboxy group and epoxy group, carboxy group and aziridyl group, or hydroxyl group and isocyanate group. Among these combinations of functional groups, a combination of hydroxyl group and isocyanate group is preferable because the reaction can be easily monitored. The functional groups may present in the acrylic polymer or the above compound insofar as the acrylic polymer having carbon-carbon double bonds can be produced by the combination of functional groups, but it is preferable that in the preferable combination described above, the acrylic polymer has a hydroxyl group while the above compound has an isocyanate group. In this case, the isocyanate compound having a carbon-carbon double bond includes, for example, methacryloyl isocyanate, 2-methacryloyloxyethyl isocyanate, m-isopropenyl-α,α-dimethylbenzyl diisocyanate etc. The acrylic polymer makes use of a copolymer of the above-exemplified hydroxyl group-containing monomer and an ether-based compound such as 2-hydroxyethyl vinyl ether, 4-hydroxybutyl vinyl ether, or diethylene glycol monovinyl ether.

In the inherent radiation-curing adhesive, the base polymer having carbon-carbon double bonds, particularly the acrylic polymer, can be used alone, but the radiation-curing monomer components and oligomer components can also be compounded therein to such an extent as not to deteriorate the characteristics. The amount of the radiation-curing oligomer components etc. is usually 30% by weight or less, preferably 10% by weight or less, based on 100 parts by weight of the base polymer.

For curing with UV rays etc., a photopolymerization initiator is contained in the radiation-curing adhesive. The photopolymerization initiator may be any compound cleaved to form radicals upon irradiation with UV rays of suitable wavelength capable of causing the polymerization reaction. The photopolymerization initiator includes, for example, benzoin alkyl ethers such as benzoin methyl ether, benzoin isopropyl ether and benzoin isobutyl ether; aromatic ketones such as benzyl, benzoin, benzophenone and α-hydroxy cyclohexyl phenyl ketone; aromatic ketals such as benzyl dimethyl ketal; polyvinyl benzophenone; and thioxanthones such as chlorothioxanthone, dodecyl thioxanthone, dimethyl thioxanthone and diethyl thioxanthone. The amount of the photopolymerization initiator is for example 1 to 10 parts by weight, preferably 3 to 5 parts by weight, based on 100 parts by weight of the base polymer such as the acrylic polymer constituting the adhesive.

On one hand, the thermally foaming adhesive comprises thermally expandable fine particles incorporated into the general pressure-sensitive adhesive described above. The thermally foaming adhesive facilitates release by reducing the adhesion area by foaming the thermally expandable fine particles upon heating, and the average particle diameter of the thermally expandable fine particles is preferably 1 to 25 μm. The average particle diameter is more preferably 5 to 15 μm, still more preferably about 10 μm. The thermally expandable fine particles are not particularly limited insofar as they can expand under heating. For example, thermally expandable microcapsules produced by in-situ polymerization by encapsulating suitable low-boiling components forming gases such as butane, propane or pentane in copolymer walls of vinyl chloride, acrylonitrile etc. The thermally expandable microcapsules have an advantage that they are excellent in an ability to be dispersed in and mixed with the adhesive. Commercial products of the thermally expandable microcapsules include, for example, Microsphere™ manufactured by Matsumoto Yushi Co., Ltd.

Depending on the type of the adhesive layer, the amount of the thermally expandable fine particles, exemplified the thermally expandable microcapsules, incorporated into the adhesive can be suitably determined such that the adhesion of the adhesive can be reduced, and this amount is generally 1 to 100 parts by weight, preferably 5 to 50 parts by weight, more preferably 10 to 40 parts by weight, based on 100 parts by weight of the base polymer.

The adhesive sheet of the present invention can be produced for example by forming an adhesive layer on the base film. The method of forming the adhesive layer is not particularly limited, and use can be made of, for example, a method of forming the adhesive layer by applying it directly onto the base film or a method forming the adhesive layer by separately forming it on a separator and then sticking the adhesive layer on the base film. The thickness of the adhesive layer is 7 μm or less is more preferable. From the viewpoint of reducing chipping, an adhesive layer having a storage modulus (23° C.) of $3 \times 10^1$ to $1 \times 10^5$ N/cm$^2$ at 0 to 10° C. is preferably used.

A base film constituting the separator is not particularly limited insofar as it is a film (including a sheet) capable of protecting the adhesive layer. Examples thereof include plastic films such as polyether ether ketone, polyether imide, polyallylate, polyethylene naphthalate, polyethylene film, polypropylene film, polybutene film, polybutadiene film, polymethylpentene film, polyvinyl chloride film, vinyl chloride copolymer film, polyethylene terephthalate film, polybutylene terephthalate film, polyurethane film, ethylene-vinyl acetate copolymer film, ionomer resin film, ethylene-(meth)acrylic acid copolymer film, ethylene-(meth)acrylate copolymer film, polystyrene film and polycarbonate film.

A thickness of the film is usually 5 to 200 μm, preferably 25 to 100 μm, more preferably 38 to 60 μm. The surface of the film on which the adhesive is stuck may be treated with a releasing agent based on silicone (including UV curing agent), fluorine, or a long alkyl or fatty amide, or with silica.

The adhesive sheet of this invention is stored usually in a rolled state and unrolled if necessary for use in the dicing step.

EXAMPLES

Hereinafter, the present invention is described in more detail by reference to the Examples, but this invention is not limited by the Examples. The tensile modulus of the base film is initial tensile modulus determined from an S—S curve obtained by pulling it at a rate of 300 mm/min. at 23° C., with a film width of 10 mm and a distance between chucks of 10 mm.

Example 1

A composition comprising of 70 parts by weight of methyl acrylate, 30 parts by weight of butyl acrylate and 5 parts by weight of acrylic acid was copolymerized in ethyl acetate to obtain a solution having a solids content of 25% by weight, containing an acrylic copolymer having a number-average molecular weight of 800,000. To the solution was added 60 parts by weight of dipentaerythritol hexaacrylate (Karayad DPHA™, manufactured by Nippon Kayaku Co., Ltd.), 5 parts by weight of a radical polymerization initiator (Irgacure 651™, manufactured by Ciba Specialties Chemicals) and 5 parts by a polyisocyanate compound (Coronate L™, manufactured by Nippon Polyurethane), whereby an acrylic UV-curing adhesive solution was prepared.

As the base film, a polyester film of 150 μm in thickness (tensile modulus 1.5 GPa), one side of which had been treated with corona, was used. The corona-treated side of this base film was coated with the above adhesive solution and dried under heating, to form a UV-curing adhesive layer of 4 μm in thickness thereon. Then, a separator was stuck on the surface of the adhesive layer to produce a UV-curing adhesive sheet. As the separator, a polyester film of 38 μm in thickness (Luminar S-10 #50™, manufactured by Toray), having an adhesive layer-sticking surface subjected to treatment with a releasing agent, was used.

Example 2

A UV-curing adhesive sheet was obtained in the same manner as in Example 1 except that a thickness of the adhesive layer was 5 μm.

Example 3

A UV-curing adhesive sheet was obtained in the same manner as in Example 1 except that a thickness of the adhesive layer was 7 μm.

Example 4

A UV-curing adhesive sheet was obtained in the same manner as in Example 1 except that a polyester film of 188 μm in thickness was used as the base film, and a thickness of the adhesive layer was 5 μm.

Example 5

A UV-curing adhesive sheet was obtained in the same manner as in Example 1 except that a polyester film of 225 μm in thickness was used as the base film, and a thickness of the adhesive layer was 5 μm.

Comparative Example 1

A UV-curing adhesive sheet was obtained in the same manner as in Example 1 except that a thickness of the adhesive layer was 10 μm.

Comparative Example 2

A UV-curing adhesive sheet was obtained in the same manner as in Example 1 except that a thickness of the adhesive layer was 20 μm.

Comparative Example 3

A UV-curing adhesive sheet was obtained in the same manner as in Example 1 except that a polyester film of 125 μm in thickness was used as the base film.

Comparative Example 4

A UV-curing adhesive sheet was obtained in the same manner as in Example 1 except that a polyvinyl chloride film of 185 μm in thickness (tensile modulus, 0.2 GPa) was used as the base film, and a thickness of the adhesive layer was 5 μm.

The thickness of each of the base films and adhesive layers obtained in the Examples and Comparative Examples is shown in Table 1.

TABLE 1

| | Thickness (μm) | |
|---|---|---|
| | Base film | Adhesive layer |
| Example 1 | 150 | 4 |
| Example 2 | 150 | 5 |
| Example 3 | 150 | 7 |
| Example 4 | 188 | 5 |
| Example 5 | 225 | 5 |
| Comparative Example 1 | 150 | 10 |
| Comparative Example 2 | 150 | 20 |
| Comparative Example 3 | 125 | 5 |
| Comparative Example 4 | 185 | 5 |

Evaluation Tests

The UV-curing adhesive sheets obtained in the Examples and Comparative Examples were evaluated in the following manner.

(1) Dicing Test

A soda glass (a glass substrate) of 1 mm in thickness was left for 10 minutes on a substrate at a predetermined temperature (23° C., 40° C., 60° C.) such that the temperature of the glass substrate was made identical with the predetermined temperature of the substrate. Then, the adhesive sheet was stuck on the glass substrate, then left at ordinary temperatures for a predetermined time (0.5 hour, 3 hours, 12 hours, 24 hours) and diced under the following conditions.

Cut speed: 2.5 mm/s

Number of revolutions of spindle: 20,000 rpm

Blade: G1A851SD400R13B01 blade having a thickness of 210 μm, manufactured by DISCO Cutting height: 50 μm Dicing was conducted for cut piece sizes of 1 mm×1 mm, 3 mm×3 mm and 5 mm×5 mm, respectively. After dicing was finished, the state of chip scattering including surrounding chips was evaluated under the following criteria. The results are shown in Tables 2, 3 and 4 for the respective sizes of the cut pieces.

⊚: No scattering of chips in the surrounding region and in the product.

○: Slight scattering of chips in the surrounding region with no scattering of chips in the product.

X: Much scattering of chips in the surrounding region and scattering of chips in the product.

TABLE 2

Scattering of chips during sizing/dicing size: 1 mm × 1 mm

| Temperature (° C.) of the substrate during sticking | Time (hours) elapsed after sticking | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| 23 | 0.5 | X | X | X | X | X | ⊚ | ⊚ | X | X |
| | 3 | X | X | ○ | X | X | — | — | X | X |
| | 12 | X | ○ | ○ | ○ | ○ | — | — | X | ○ |
| | 24 | ○ | ○ | ⊚ | ○ | ○ | — | — | ○ | ○ |
| 40 | 0.5 | ○ | ○ | ⊚ | ○ | ○ | — | — | ○ | ○ |
| 60 | 0.5 | ⊚ | ⊚ | ⊚ | ⊚ | ⊚ | — | — | ⊚ | ⊚ |

TABLE 3

Scattering of chips during sizing/dicing size: 3 mm × 3 mm

| Temperature (° C.) of the substrate during sticking | Time (hours) elapsed after sticking | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| 23 | 0.5 | X | X | ○ | X | X | ◎ | ◎ | X | X |
|    | 3   | X | ○ | ○ | ○ | ○ | — | — | X | ○ |
|    | 12  | ○ | ○ | ◎ | ○ | ○ | — | — | ○ | ○ |
|    | 24  | ◎ | ◎ | ◎ | ◎ | ◎ | — | — | ◎ | ◎ |
| 40 | 0.5 | ◎ | ◎ | ◎ | ◎ | ◎ | — | — | ◎ | ◎ |
| 60 | 0.5 | ◎ | ◎ | ◎ | ◎ | ◎ | — | — | ◎ | ◎ |

TABLE 4

Scattering of chips during sizing/dicing size: 5 mm × 5 mm

| Temperature (° C.) of the substrate during sticking | Time (hours) elapsed after sticking | Example 1 | Example 2 | Example 3 | Example 4 | Example 5 | Comparative Example 1 | Comparative Example 2 | Comparative Example 3 |
|---|---|---|---|---|---|---|---|---|---|
| 23 | 0.5 | ○ | ○ | ○ | ○ | ○ | ◎ | ◎ | ○ |
|    | 3   | ○ | ○ | ○ | ○ | ○ | — | — | ○ |
|    | 12  | ○ | ○ | ◎ | ○ | ○ | — | — | ○ |
|    | 24  | ◎ | ◎ | ◎ | ◎ | ◎ | — | — | ◎ |
| 40 | 0.5 | ◎ | ◎ | ◎ | ◎ | ◎ | — | — | ◎ |
| 60 | 0.5 | ◎ | ◎ | ◎ | ◎ | ◎ | — | — | ◎ |

(2) Backside Chipping

After the dicing (temperature of the substrate during sticking, 60° C.; the time elapsed after sticking, 0.5 hour; the size of cut pieces, 3 mm×3 mm), the cut pieces were irradiated with UV rays at 35 mW/cm$^2$·s for 13 seconds, and the cut glass substrate(G) was released from the adhesive sheet. The first, the second, the third and the fourth cut line were represented by L1, L2, L3 and L4. Chipping in the fourth cut line(L4) on the back of the cut glass substrate(G) was observed under a microscope. As shown in FIG. 2, the maximum chipping (W: μm) was measured for each of the chips, and the average value of 20 chips was expressed as the amount of chips. The results are shown in Table 5.

(3) Irregular Shape

After the dicing (temperature of the substrate during sticking, 60° C.; the time elapsed after sticking, 0.5 hour; the size of cut pieces, 3 mm×3 mm), a section of each cut piece was observed under a microscope and evaluated under the following criteria. In Comparative Example 5, all chips had cracking. The results are shown in Table 5.

○: The section was straight.
X: The section had an irregular shape as shown in FIG. 3.

TABLE 5

|  | Chipping (μm) | Irregular shape |
|---|---|---|
| Example 1 | 18 | ○ |
| Example 2 | 21 | ○ |
| Example 3 | 28 | ○ |
| Example 4 | 24 | ○ |
| Example 5 | 22 | ○ |
| Comparative Example 1 | 40 | ○ |
| Comparative Example 2 | 63 | ○ |
| Comparative Example 3 | 19 | X |
| Comparative Example 4 | 27 | X |

What is claimed is:

1. A method of dicing glass substrate comprising steps of:
   sticking an adhesive sheet comprising: a single base film having a thickness of 130 μm or more and a tensile modulus of 1–4 Gpa and an adhesive layer formed on the base film at a thickness of 9 μm or less on a glass substrate,
   and dicing the glass substrate while the adhesive sheet is adhered to the glass substrate.

2. The method of dicing glass substrate according to claim 1, wherein the base film is a polyester film.

3. The method of dicing glass substrate according to claim 1, wherein the adhesive layer is a radiation-curing adhesive layer.

4. The method of dicing glass substrate according to claim 1, wherein the glass substrate is cut by dicing into pieces of 3 mm×3 mm or less in size.

5. The method of dicing glass substrate according to claim 4, wherein the glass substrate is diced after being left for at least 24 hours after sticking the adhesive sheet thereon.

6. The method of dicing glass substrate according to claim 1, wherein the adhesive sheet is stuck on the glass substrate under heating to a temperature of 40° C. or more.

* * * * *

UNITED STATES PATENT AND TRADEMARK OFFICE
CERTIFICATE OF CORRECTION

| | | |
|---|---|---|
| PATENT NO. | : 7,041,190 B2 | |
| APPLICATION NO. | : 10/452893 | |
| DATED | : May 9, 2006 | |
| INVENTOR(S) | : Yuuji Ookawa | |

It is certified that error appears in the above-identified patent and that said Letters Patent is hereby corrected as shown below:

At Column 1, Line 65-67, delete "wherein the base film has a thickness of 130 μm ... thickness of 9 μm or less." And insert the same on Line 64 as continuation paragraph.

At Column 10, Line 42, insert --◎-- before ": No".

At Column 12, Line 57-58 (approximately), in Claim 5, delete "claim 4," and insert --claim 1,--, therefor.

Signed and Sealed this
Tenth Day of May, 2011

David J. Kappos
*Director of the United States Patent and Trademark Office*